Aug. 14, 1962   W. V. WRIGHT, JR   3,049,685
ELECTRICAL STRAIN TRANSDUCER
Filed May 18, 1960   2 Sheets-Sheet 1
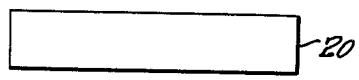
FIG. 1.
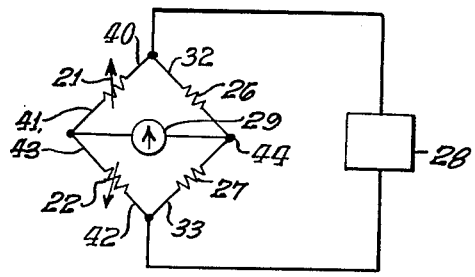
FIG. 4.
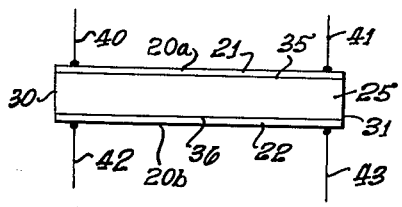
FIG. 2.
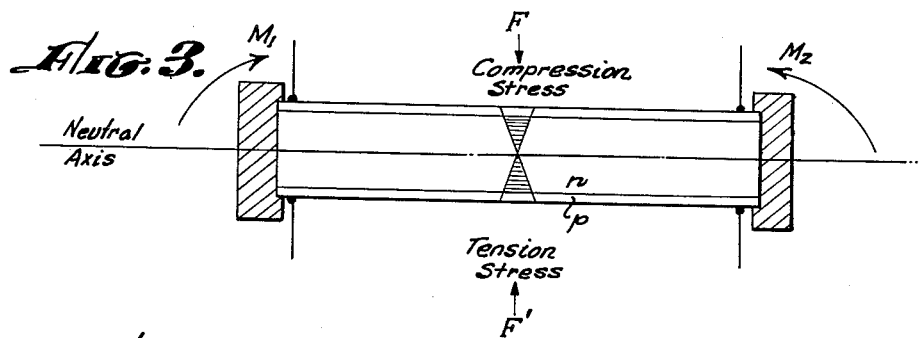
FIG. 3.
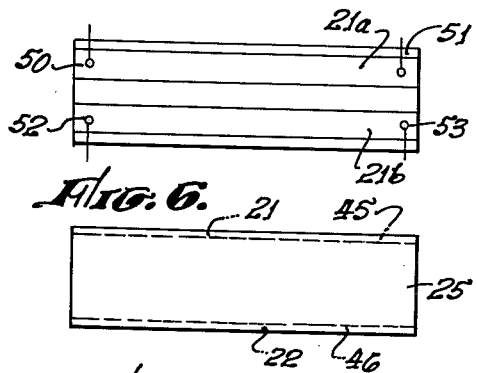
FIG. 5.
FIG. 6.
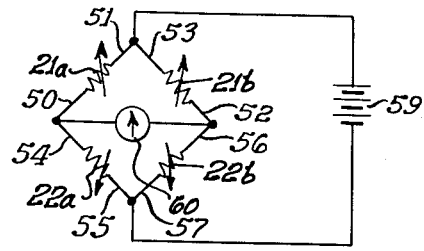
FIG. 8.
FIG. 7.
WILLIAM V. WRIGHT, JR.
INVENTOR.
BY Spensley and Horn
ATTORNEYS.

Aug. 14, 1962 W. V. WRIGHT, JR 3,049,685
ELECTRICAL STRAIN TRANSDUCER
Filed May 18, 1960 2 Sheets-Sheet 2
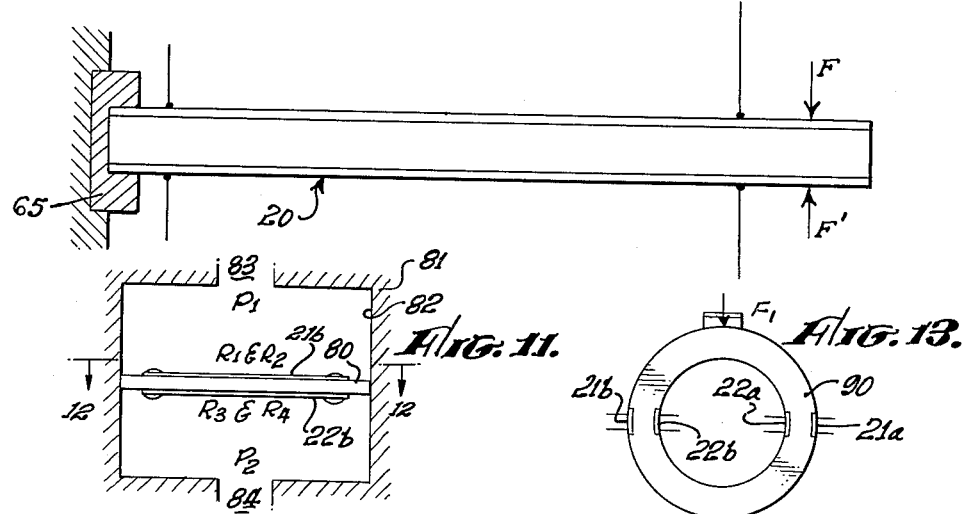
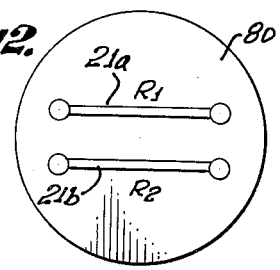
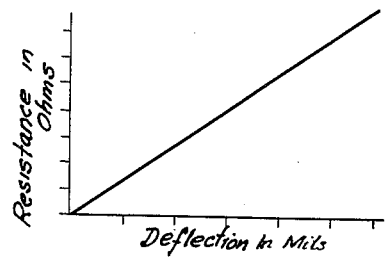
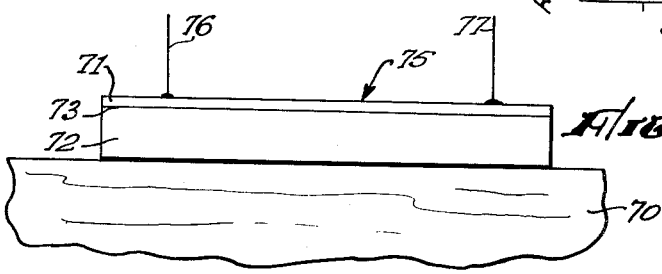
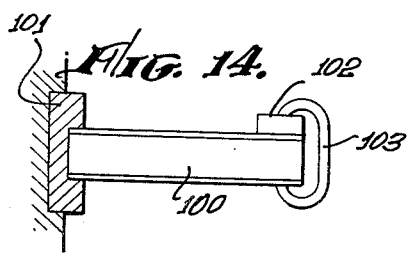
WILLIAM V. WRIGHT, JR.
INVENTOR.
BY Spensley and Horn
ATTORNEYS.

United States Patent Office 3,049,685
Patented Aug. 14, 1962

3,049,685
ELECTRICAL STRAIN TRANSDUCER
William V. Wright, Jr., San Marino, Calif., assignor to Electro-Optical Systems, Inc., Pasadena, Calif., a corporation of California
Filed May 18, 1960, Ser. No. 29,837
14 Claims. (Cl. 338—2)

This invention relates to strain-electrical translating elements and more particularly to a strain gauge employing a semiconductor element.

This invention further relates to and may be employed in various types of transducers such as motion sensing devices, accelerometers and other instruments for measuring movements, forces, pressures, torques, accelerations and the like.

Strain gauges are employed in two basic configurations: bonded and unbonded. The device of the present invention is applicable to both.

Prior art strain gauges of the unbonded type typically include a strain sensitive metal wire translating element connected to two supports which are subject to tension under an applied force, the magnitude of which is to be determined. When subjected to tension the wire changes in dimension and electrical resistivity, and therefore in overall resistance. It is this change in resistance which is measured, for example, by a well-known Wheatstone bridge.

The name given to a change in resistivity caused by applied stress is the piezoresistance effect. All materials probably exhibit the piezoresistance effect to a degree. This effect is particularly pronounced for semiconductor materials including silicon and germanium.

A thin rod or bar of any material exhibiting a sufficient piezoresistance effect can be used in a manner similar to that of the well-known prior art wire strain gauges. Young's modulus, E relates the change in stress to the strain by the equation $$E = \frac{S}{\epsilon}$$

where S represents stress and $\epsilon$ represents strain. In a crystalline material such as silicon, E varies with direction. $\epsilon$, in the above equation, is the longitudinal strain resulting from simple tension P, assuming no stress in the transverse direction. The fractional change in resistivity due to a tension P is $$\frac{\Delta \rho}{\rho} = \pi P$$

where $\pi$ is the longitudinal piezoresistance coefficient and where $\rho$ represents the resistivity of the material. Thus, $$\frac{\Delta \rho}{\rho} = \pi \epsilon E$$

This can be written as $M \epsilon$, where M is defined as $\pi E$.

Since R of any material $= \rho L/A$, where R is the resistance of a rod, $\rho$ the resistivity, L its length and A its cross-sectional area, it can be shown, for a simple case that $$\frac{\Delta R}{R} = (1 + 2\delta + M) \epsilon$$

$\delta$ denotes Poisson's ratio; i.e., the ratio of the magnitude of transverse strain to longitudinal strain resulting from the postulated simple tension P. In the above equation, the first term on the right expresses the resistance change due to change in length; the second term is due to the change in area, and the third term is due to the resistivity change. The factor $$K = \frac{\Delta R}{R \epsilon} = 1 + 2\delta + M$$

is called the gauge factor. Most of the commonly used wire strain gauges have a gauge factor of between 2 and 4. Silicon and germanium have gauge factors along the [111] plane of over 150, thus indicating an increase in sensitivity of up to 75 to 1 over ordinary materials. The strain gauge of the present invention advantageously employs this phenomenon.

Prior art metallic strain gauges which are typically wire, have a relatively low gauge factor, as indicated above. Further, the output signal produced by such gauges and the signal to noise ratio are both relatively low. Additionally, such prior art strain gauges suffer in accuracy from hysteresis due to plastic and metallic flow. The mechanical stability of such wire strain gauge elements is relatively poor and their resistivity low.

While the use of semiconductor material as strain gauge elements has been known to the prior art, such strain gauges have also been subject to disadvantages. Prior art semiconductor strain gauge elements of the bonded type suffer from hysteresis and inefficient coupling to the system, while prior art unbonded semiconductor strain gauge elements are difficult to fabricate and couple to the system.

In the semiconductor art, a region of semiconductor material containing an excess of donor impurities and having an excess of free electrons is considered to be an N type region, while a P type region is one containing an excess of acceptor impurities resulting in a deficit of electrons, or stated differently, an excess of holes. When a continuous solid specimen of crystal semiconductor material has an N type region adjacent to a P type region, the boundary between them is termed a PN (or NP) junction, and the specimen of semiconductor material is termed a PN junction semiconductor device.

The term junction as used herein is intended to include, also the boundary between a P region or an N region and an intrinsic region. Additionally, the term junction as utilized herein is intended to include the boundary between an N region and an N+-region, and that between a P region and a P+-region as well as any combination of P, N, I, P+ and N+ which results in an electrical conductivity barrier between any two such adjoining regions.

A region heavily doped with an N type conductivity active impurity is designated as an N+ region, the + indicating that the concentration of the active impurity in the region is somewhat greater than the minimum required to determine the conductivity type. Similarly, a P+ region indicates a more heavily than normal doped region of P type conductivity.

In an intrinsic region the holes and electrons are in balance and hence it cannot be said to be of either N type or P type conducivity.

The term semiconductor material as utilized herein is considered generic to germanium, silicon, and germanium-silicon alloy, silicon carbide and compounds such as indium-antimonide, gallium-antimonide, aluminum-antimonide, indium-arsenide, zinc sulfide, gallium-arsenide, gallium-phosphorous alloys, and indium-phosphorous alloys and the like.

The term active impurity is used to denote those impurities which affect the electrical rectification characteristics of semiconductor materials as distinguished from other impurities which have no appreciable effect upon these characteristics. Active impurities are ordinarily classified as donor impurities such as phosphorous, arsenic, and antimony, or acceptor impurities such as boron, aluminum, gallium, and indium.

It is a primary object of the present invention to provide a strain gauge element having a relatively high gauge factor.

Another object of the present invention is to provide an integrated semiconductor strain gauge element.

Yet another object of the present invention is to provide a semiconductor strain gauge element which is free of hysteresis.

Yet a further object of the present invention is to provide a device of the character described which lends itself to ease of fabrication and which possesses an inherently high natural frequency.

A still further object of the present invention is to provide a device of the character described which can be made extremely small in size while possessing high mechanical stability and reliability.

Yet a further object of the present invention is to provide methods for producing devices of the character described.

The present invention involves, to a considerable extent, the discovery that a semiconductor strain gauge element can be constructed by providing a body of semiconductor material having a plurality of zones integrally formed within the body along a given dimension of the body. One zone is of a predetermined conductivity type and electrically isolated from a second zone of a different conductivity type adjacent thereto by means of a "junction" formed at the boundary of the first zone and the second zone. In the operation of the ordinary PN junction semiconductor device, the majority carriers move from zone to zone across the PN junction. In the present invention PN junction semiconductor device, on the other hand, the majority carriers move only within a single zone, the high impedance barrier formed by the PN junction serving to electrically isolate the different zones of the semiconductor body, there being no significant movement of majority carriers across the PN junction.

More particularly, the present invention in its presently preferred form is a strain gauge element comprising a unitary body of semiconductor material in which an intermediate first zone of the body is of one conductivity type and electrically isolates second and third zones of a different conductivity type which are integrally formed in the body. The second and third zones are spaced apart by the first zone and electrically isolated one from the other by means of the high impedance barriers provided by the junctions formed at the boundaries of the first and second zones and first and third zones. The zones of the body, or element, are so arranged that elastic strain of the body will subject the second and third zones, piezoresistance gauge zones, to strains which are translated to changes in the electrical resistances of the second and third zones. The electrical resistances of the second and third zones are separately measurable, due to their electrical isolation, although such zones form integral parts of the body subjected to the strain inducing stresses. Any member such as a beam, plate, or the like, strained by bending, for example, will have a neutral axis with equal but opposite forces acting on either side of the neutral axis. In a conventional unitary body, of semiconductor or other material, these equal but opposite forces will neutralize the overall change in electrical resistance of the body. However, by the provision of integral zones in the body, in accordance with the present invention, which zones are electrically isolated from each other and from the remainder of the body, the change in electrical resistance in each zone can be detected and used to determine the extent of the applied force or forces upon the body. Thus, although the zones are subjected to strain as an integral part of the body, the electrical resistance of each zone is determinable as an electrically isolated part of the body.

The novel features which are believed to be characteristic of the present invention, both as to its organization and method of operation, together with further objects and advantages thereof, will be better understood from the following description considered in connection with the accompanying drawings in which several embodiments of the invention are illustrated by way of example. It is to be expressly understood, however, that the description is for the purpose of illustration only and that the true spirit and scope of the invention is to be defined by the accompanying claims.

In the drawings:

FIGURE 1 is a front elevation of a parent crystal body forming the basic building block of an illustrative semiconductor strain gauge element in accordance with the present invention;

FIGURE 2 is a view in elevation of the body of FIGURE 1 which has been fabricated in accordance with the present invention into a semiconductor strain gauge element;

FIGURE 3 is a stress-strain diagram of the body of FIGURES 1 and 2 subjected to bending forces;

FIGURE 4 is a schematic circuit diagram of a bridge circuit employing a semiconductor strain gauge element of FIGURE 2;

FIGURE 5 is a top plan view of a strain gauge element in accordance with an alternate embodiment of the present invention;

FIGURE 6 is a front elevation of the straing gauge element of FIGURE 5;

FIGURE 7 is a bottom plan view of the strain gauge element of FIGURE 5;

FIGURE 8 is a schematic circuit diagram of a bridge circuit employing the strain gauge element of FIGURES 5 through 7;

FIGURE 9 shows a typical strain gauge element in accordance with the embodiment of FIGURES 1 and 2 supported at one end and adapted to measure a deflection force F or F';

FIGURE 10 shows a strain gauge element in accordance with the present invention bonded to a beam the deflection of which is to be measured;

FIGURE 11 shows a strain gauge element in the form of a diaphragm within a cylinder to measure force of a fluid under pressure in accordance with another alternative embodiment of this invention;

FIGURE 12 is a sectional view taken along line 12—12 of FIGURE 11;

FIGURE 13 is a partially diagrammatic view of a second alternative embodiment of the present invention;

FIGURE 14 is a partially diagrammatic view of an accelerometer formed in accordance with the present invention; and FIGURE 15 is a graph showing deflection in mils vs. resistance in ohms of an illustrative strain gauge of the type illustrated in FIGURES 1 through 3.

Referring now to the drawings, and more particularly to FIGURE 1, there is shown a front elevation of a semiconductor crystal body 20, generally rectangular in shape. A single crystal body of semiconductor material can be produced by methods and means well known to the art. Such may be produced by growing a single crystal by withdrawing a small seed crystal from a melt of silicon. In this exemplary embodiment the silicon body is of N type conductivity produced, for example, by including a doping agent such as arsenic in the molten silicon from which the seed crystal is drawn. After the large single N type conductivity crystal is thus produced, it is sliced into wafers which wafers are then cut into rectangles. Thereafter, the wafer is lapped to the desired thickness and etched to remove surface damage caused by the cutting operations. An etch which is typically used is a 1:1:1 combination of HF, HCl and HAC. Although a single crystal is utilized in the presently preferred embodiment, polycrystal structures can be used satisfactorily.

In the illustrative embodiment under consideration, the thickness of the body or wafer 20 is approximately 0.020 inch. As an illustration of the thickness employed, the body can vary within a range of from 0.001 inch to several inches while the integral second and third zones will vary from within the range of approximately several molecules to 50 microns. In general terms, the first zone of the body is thick with respect to the second and third zones, the depth or thickness of which are several minority carrier diffusion lengths. The rectangular wafer is placed into a diffusion furnace containing a P type dopant such as boron, for example, and heated to vapor diffuse boron into the silicon body 20. There is thus produced two shallow, substantially planar, regions 21 and 22 extending from the top and bottom surfaces 20a and 20b respectively of the body 20. The depth of penetration of the boron into the surfaces 20a and 20b is a function of the time and temperature of the diffusion run as is well known in the art. In this illustrative embodiment the depth of penetration is 3 microns. Thus, there results a substantially thick first central N type conductivity region 25 which is integral and adjacent with opposing thin P type conductivity regions 21 and 22. For purposes of illustration and clarity the conductivity regions 21 and 22 are shown greatly exaggerated in the drawings.

Any penetration of the diffusant into the ends 30 and 31 of the wafer 20 is lapped off in order to insure complete electrical isolation between the P type conductivity regions 21 and 22 from the central N type conductivity region 25, i.e., by the PN junctions therebetween.

The two P type regions 21 and 22 formed in the top and bottom surfaces of the body 20 result in PN junctions 35 and 36 which serve to electrically isolate these two P type regions, or zones, from the N type conductivity region, or zone 25. It should be noted that the regions, or zones, 21 and 22 are an integral part of the body and no physical or structural change or discontinuity is present in the body. As discussed hereinbefore, the junctions 35 and 36 are electrical conductivity barriers only while the body 20 remains a solid continuous specimen of semiconductor material. Thus, the body 20 remains a unitary body with no physical distinctions or discontinuities present therein, while electrically the zones 21 and 22 are isolated, one from the other, and from the intermediate zone 25.

Lead wires 40 and 41 are electrically connected near opposite ends of the upper P type zone 21 while lead elements 42 and 43 are electrically connected near the opposite ends of the bottom P type zone 22. The leads 40, 41, 42 and 43 make ohmic contact with their associated P type regions. This may be accomplished by any well-known prior art technique such as metal plating followed by soldering or alloying. The P type zones 21 and 22 are then interconnected, as resistances 21 and 22, together with known resistance elements 26 and 27 through leads 40, 41, 42 and 43 to form the bridge circuit as shown in FIGURE 4. That is, as discussed further, hereinafter, the zone 21 acts as a resistance between leads 40 and 41, and zone 22 acts as a resistance between leads 42 and 43. A well-known bridge circuit is thus provided by connecting leads 41 and 43. Known resistance elements 26 and 27 are interconnected at a point 30 and the leads 32 and 33 at opposite sides of the resistances 26 and 27 respectively are connected to leads 40 and 42 of the resistances 21 and 22 respectively. An output signal meter 29 is connected between the point 44 and the connected leads 41—43 and a source of excitation 28, either A.C. or is connected between the joined leads 40—32 and the joined leads 42—33. Thus, a well-known Wheatstone bridge circuit, as shown in FIGURE 4, is provided with zones 21 and 22 forming two arms thereof as resistances 21 and 22.

Referring now to FIGURES 2, 3 and 4, there is shown in FIGURE 3 a stress-strain diagram superimposed upon the devices of FIGURES 1 and 2. When bending moments $M_1$ and $M_2$ are exerted on the body 20 which acts as a beam, as, for example, by fixing the ends thereof and exerting a downward force F on the upper surface of the body, the beam is strained by bending and will have a neutral axis extending longitudinally through the body as shown. Equal but opposite forces will act upon the body at opposite sides of the neutral axis. With the moments $M_1$ and $M_2$ applied as shown in FIGURE 3, the portion of the body 20 above the neutral axis is subjected to compression strain while that below the axis is subjected to tension strain. Thus, in the simple case utilized for illustration wherein there are no external forces having components parallel to the length of the beam the resultant compressive stress is equal to the resultant tensile stress and the unit stress varies directly as the distance from the neutral axis. The maximum compressive stress occurs at the surface 20a of the body or substantially at the zone 21 of the body while the maximum tensile stress occurs at the lower surface 20b, or substantially in the zone 22 of the body. The compression stress, or strain (deformation), in the upper zone 21 will cause an increase in the resistance of the zone 21 due to the piezoresistance effect discussed hereinbefore and in accordance with the formula given in connection with the discussion. Conversely, the tensile stress, or strain, in the lower zone 21 will cause a decrease in the electrical resistance of that zone. The change in electrical resistance is measured only in these outer zones of the beam due to the electrical isolating properties of the PN junction separating each of the zones 21 and 22 from the intermediate zone 25. From FIGURE 3 it can be seen that without the electrical isolation of the zones 21 and 22 the changes in resistance of the overall body would be self-cancelling. That is, the change in resistance due to compression within a portion of the body would be equal but opposite to the change of resistance due to tension within another portion of the body such that the overall resistance of the body would be neutralized and no change of resistance as a function of applied forces could be detected. By the provision of electrically isolated sections of the body the changes of resistance within those sections can be independently measured as a function of the stresses resulting in those integral sections of the body. Since the sections, or zones, are physically integral, the stresses created within the zones are a true indication of the stresses to which the body is subjected.

The equal and opposite resistance effects within the zones 21 and 22 are effectively separated by the isolating property of the PN junctions, thus permitting the two zones 21 and 22 to be employed separately as arms in the conventional Wheatstone type strain gauge bridge of FIGURE 4. The output signal as indicated by the meter 29 will thus be proportional to, or a function of, the load F'. If a load is applied in the opposite direction as indicated by the arrows F', the output signal generated will be indicated by the meter 29 in the opposite direction since zone 21 will now be in tension and zone 22 will be in compression.

In FIGURES 5, 6 and 7, an alternative embodiment of the present invention is shown which is constructed to provide the four arm resistances of a bridge circuit as integral parts of the device body. P type regions 21a, 21b, 22a and 22b are preferably formed in a pattern of two parallel rectangles spaced apart at opposite sides of the central region 25. Thus, there is provided a single integral body of semiconductor material with surface areas of P type conductivity insulated from the bulk material by PN junctions designated 45 and 46 in FIGURE 6. In order to produce the P type regions 21a and 21b and 22a and 22b by diffusion, a mask is employed to define this configuration. Thereafter, an etch is used to remove the surface material formed by the junction except where the mask is used to prevent the etch from attacking the surface. Of course, the depth of the removal of the material by the etch must be greater than the depth of penetration of the diffusant in order to be effective. The regions 21a, 21b, 22a and 22b are all electrically isolated one from the other. Thereafter, wire leads 50, 51, 52, 53, 54, 55, 56 and 57 attached to the P type regions 21a, 21b, 22a and 22b, respectively, proximate opposite ends thereof, as is indicated in FIGURES 5, 6 and 7. The wire leads are in ohmic contact with the respective P type conductivity regions. The zones 21a, 21b, 22a and 22b are then connected to form a bridge with a source of excitation 59 and an output meter 60 as shown in FIGURE 8, by interconnecting the leads 51 and 53, 50 and 54, 55 and 57, and 58 and 52. When a load indicated by the arrow F is applied to the body 20 as shown in FIGURE 4, sections 21a and 21b are placed in compression and sections 22a and 22b are placed in tension as described hereinbefore in connection with the embodiment of FIGURE 2. The output as indicated by the meter 60 will thus be proportional to the load F. If the load is applied in the opposite direction as indicated by the arrows F', the output indicated by the meter 60 will reverse since sections 21a and 21b will now be in tension while sections 22a and 22b will be in compression.

The force applied to the device can be applied and measured in various ways and the device of the present invention can take various force sensing or measuring forms depending upon the various forces to be detected or measured. The present invention is primarily directed toward a strain sensing element constructed as herein described. Thus, the force may be the result of a mechanical system, a mass under acceleration, a fluid or the like, and the sensing device can be constructed in various forms and configurations and within various device housings, dependent upon the application to which the sensing element is to be put. In addition, although oppositely oriented second and third zones are shown and described as illustrative other formations of multiple zones can be employed. For example, a plurality of zones can be so oriented at one surface of the first zone that the second zone receives tension stress while the third zone receives compression stress.

In FIGURE 9 there is shown a strain gauge element 20 constructed in accordance with the present invention and similar in all respects to that shown in FIGURE 2. The FIGURE 9 embodiment depicts the element 20 as being supported by support 65, thus being cantilevered and adapted to measure a force F or F' applied thereto.

In FIGURE 10 there is shown a bonded semiconductor strain gauge element in accordance with the present invention. Therein, the element is bonded to a beam 70 by any suitable means in order to indicate the strain to which the beam 70 is subjected by any force. In this embodiment, a semiconductor unitary crystal body 75 has an upper longitudinal zone 71 of P type conductivity and a lower longitudinal zone 72 of N type conductivity, the zones 71 and 72 being separated by a PN junction 73. The high impedance barrier formed by the PN junction 73 serves to electrically isolate the zones 71 and 72 from each other and enables the separate measurement of the resistance of zone 71 between electrical leads 76 and 77 ohmically bonded near opposite ends thereof. The PN junction 73 may be formed by the well-known diffusion technique, the performance of which results in the diffusion of active impurity atoms of P type conductivity into the upper surface of an N type parent crystal to form the P type zone 71. The P type zone 71 is much thinner than the N type zone 72 and it is readily apparent that the neutral axis of the crystal body 20 is within the N type zone 72. Hence, bending of the crystal body 75 upon stressing of the beam 70 results in a change in resistance of the zone 71, the resistance change being measurable by suitable apparatus connected to the electrical leads 76 and 77. Again, in accordance with the basic concepts of the present invention, the electrical isolation of a particular zone of the integral semiconductor body by a PN junction therein facilitates measurement of a resistance which varies in accordance with applied stresses.

An alternate form of a strain sensing element in accordance with the present invention is shown in FIGURES 11 and 12, and is utilized in a pressure responsive embodiment adapted to determine the pressure differential of fluid at each side of the element. Thus, the strain element 80 of FIGURES 11 and 12 is in all respects similar to that hereinabove discussed in connection with FIGURES 5, 6 and 7 with the exception that the semiconductor body of the device is of circular shape as shown in FIGURE 12. The upper zones 21a and 21b, the lower zones 22a and 22b, as well as the ohmic contacts proximate each end of each zone as formed as described hereinbefore. In this illustrative embodiment the device body 80 is positioned within a closed cylinder 81 with the periphery of the body 80 fixed at the internal wall 82 of the cylinder. The device thus acts as a diaphragm. Fluid inlets 83 and 84 to the cylinder are positioned to conduct fluid to opposite sides of the device body 80. Accordingly, a pressure $P_1$ exists at one side of the body while a pressure $P_2$ exists at the opposite side of the body. The zones 21a, 21b, 22a and 22b are connected as a bridge circuit as previously described such that a pressure differential between the pressures $P_1$ and $P_2$ can be detected and measured.

In FIGURE 13 still another embodiment of the present invention is shown to illustrate a non-planar configuration of the present invention which can be utilized. In FIGURE 13, the crystal body is a single crystal ring 90 with the zones 21a and 21b formed at the outside circumferential surface of the ring at diametrically opposed locations and with the opposite zones 22a and 22b formed at the inside circumferential surface along the same diameter. Ohmic contacts are connected to the zones as discussed hereinbefore to measure the stress within the zones created by the forces $F_1$ and $F_2$ applied to the ring or toroid.

In FIGURE 14 there is shown, partially diagrammatically, a device in accordance with the present invention utilized as an accelerometer. Thus, a device body 100 as previously described is affixed at one end to a case or housing 101 which is in turn affixed to an object, not shown, which is subjected to acceleration or deceleration. A weight, or mass 102, is affixed at the opposite end of the device body by suitable means such as a clamp 103. When the housing 101 is subjected to shock, acceleration, or deceleration will exert inertial forces on the body which forces can be readily transposed to acceleration as is well-known to the art. Although a cantilevered mass is shown, it will be apparent that a diaphragm or similar body can be used with the mass positioned along the longitudinal axis.

The present invention thus provides an improved strain gauge element in which the sensing elements are atomically bonded to the parent crystal lattice with no intermediate atomic species. Therefore, the strain sensing elements, which are in effect discrete areas covering all or predetermined portions of the surface of a parent semiconductor crystal, are intrinsically and permanently formed as a part of the parent structure. They are thus constrained to experience the stresses and strains experienced by the structure. As semiconductor crystals are strong but not ductile at ordinary temperatures, it is impossible for plastic deformation to occur. The resultant stress or strain measuring system, unlike prior art semiconductor elements, cannot experience mechanical hysteresis.

FIGURE 15 is a graph of the deflection in mils of the device of FIGURES 1–4, vs. null resistance in ohms of the circuit of FIGURE 4 and illustrates the linearity of the device as a strain sensing element. It should be noted that with repeated testing the linearity of the graph prevailed indicating a substantially total lack of hysteresis.

The device of the present invention, by taking advantage of the very high semiconductor strain gauge factors, serves to raise the signal level and the signal-to-noise ratio to levels considerably higher than those of prior art devices.

The junction surface strain gauge design including a plurality of integral isolated strain gauge elements, permits each strain sensing element to have optimum impedance levels for electrical instrumentation. Additionally, the strain sensing elements in accordance with the present invention may be made much smaller in size than prior art devices, thereby permitting miniaturization of transducers employing such elements.

The present invention integral structure results in much higher strain coupling efficiency and permits a higher natural frequencies in transducers than those permitted by the prior art devices. The single integral crystal design of the strain sensing element of this invention inherently improves the mechanical stability and reliability of devices employing the same. Additionally, the single or integral crystal structure serves to deliver significantly larger power dissipation in the strain measuring elements than that presently permissible in wire or filamentary type structures.

There has thus been described a new and improved strain gauge device, the embodiments discussed are meant to be exemplary only. Various other patterns, in addition to rectangles, on beams, may be employed such as rings, cylinders, diaphragms, plates oblate ellipsoids, paraboloids, and the like. Further, the number of strain sensing elements may vary from one to a large plurality and each sensing element may have any number of electrical leads connected thereto.

These and other changes may be made by one skilled in the art without departing from the true spirit of the invention.

What is claimed is:

1. A strain gauge device comprising a unitary body of semiconductor material, said body having a gauge zone therein, said gauge zone being shallow in comparison to said body and having a length which is many times its thickness, a semiconductor barrier junction electrically isolating said gauge zone from the remainder of said body, and means for connecting said body to external circuitry, said means consisting of first and second spaced ohmic contacts disposed solely on said gauge zone, whereby a change in stress of said gauge zone may be measured as a change in resistance of said gauge zone.

2. A strain gauge device comprising a unitary body of semiconductor material, said body having a gauge zone therein, said gauge zone being shallow in comparison to said body and having a length which is many times its thickness, a semiconductor barrier junction electrically isolating said gauge zone from the remainder of said body, and electrical contacts on said body consisting of first and second spaced ohmic contacts disposed solely on said gauge zone of said body, whereby a change in stress of said gauge zone may be measured as a change in resistance of said gauge zone.

3. A strain gauge device comprising a unitary body of semiconductor material, said body having a first zone of a predetermined type conductivity and a piezoresistance gauge zone of a different type conductivity from said first zone to thereby form a junction barrier electrically isolating said zones, said gauge zone having at least one dimension along a surface thereof which is great in comparison to its thickness, and means for connecting said unitary body to external circuitry, said means consisting of separated ohmic contacts disposed solely on said gauge zone, there being at least two said contacts, whereby a change in stress of said gauge zone may be measured as a change in resistance of said gauge zone.

4. A strain gauge device comprising a unitary body of semiconductor material, said body having a first zone of a predetermined type conductivity and first and second piezoresistance gauge zones, said gauge zones being of a different type conductivity from said first zone to thereby form first and second junction barriers electrically isolating said first zone from said first and second pieroresistance gauge zones, said gauge zones each having at least one dimension along a surface thereof which is great in comparison to its thickness, and means for connecting said unitary body to external circuitry, said means consisting of separated ohmic contacts disposed solely on said gauge zones, there being at least two said contacts on each of said gauge zones, whereby a change in stress of said gauge zones may be measured as a change in the resistance of said gauge zones.

5. A strain gauge device comprising a unitary body of semiconductor material, said body having a first zone of a predetermined type conductivity and a piezoresistance gauge zone of a different type of conductivity from said first zone to thereby form a junction barrier electrically isolating said zones, said piezoresistance gauge zone being thinner than said first zone, and means for connecting said unitary body to external circuitry, said means consisting of separated ohmic contacts disposed solely on said gauge zone, there being at least two said contacts, whereby a change in stress of said gauge zones may be measured as a change in resistance of said gauge zones.

6. A strain gauge device comprising a unitary body of semiconductor material, said body having a first zone of a predetermined type conductivity and a piezoresistance gauge zone of a different type conductivity from said first zone to thereby form a junction barrier electrically isolating said zones, said gauge zone having a thickness not in excess of 5 microns, which thickness is substantially less than one dimension of a surface thereof, and means for connecting said surface of said unitary body to external circuitry, said means consisting of separated ohmic contacts disposed solely on said gauge zone, there being at least two said contacts, whereby a change in stress of said gauge zone may be measured as a change in resistance of said gauge zone.

7. A strain gauge device comprising a unitary body of semiconductor material, said body having a first zone of a predetermined type conductivity and first and second piezoresistance gauge zones, said zones being of different type conductivity from said first zone to thereby form first and second junction barriers electrically isolating said first zone from said first and second piezoresistance gauge zones, said gauge zones having a thickness not in excess of 5 microns which thickness is substantially less than one dimension of a surface thereof, said body intermediate said gauge zones having a thickness substantially in excess of 5 microns, and means for connecting said surface of said unitary body to external circuitry, said means consisting of separated ohmic contacts disposed solely on said gauge zones, there being at least two said contacts on each of said gauge zones, whereby a change in stress of said gauge zones may be measured as a change in the resistance of said gauge zones.

8. A strain gauge device comprising a unitary body of semiconductor material, said body having a first zone of a predetermined type conductivity along a given dimension of said body between a first and second piezoresistance gauge zone of a different type conductivity from said first zone to thereby form junctions to electrically isolate said first zone from said gauge zones, said gauge zones being substantially thinner than said first zone, said gauge zones each having at least one dimension along a surface thereof which is great in comparison to its thickness, and means for connecting said surface of said unitary body to external circuitry, said means consisting of separated ohmic contacts disposed solely on said gauge zones, there being at least two said contacts on each of said gauge zones, whereby a change in stress of said gauge zones may be measured as a change in the resistance of said gauge zones.

9. A strain gauge device comprising a unitary body of semiconductor material, said body having a first zone of a predetermined conductivity type and a piezoresistance gauge zone of the opposite conductivity type from said first zone to thereby form a PN junction barrier electrically isolating said zones, said gauge zone having at least one dimension along a surface thereof which is great in comparison to its thickness, and means for connecting said surface of said unitary body to external circuitry, said means consisting of separated ohmic contacts disposed solely on said gauge zone, there being at least two said contacts, whereby a change in stress of said gauge zone may be measured as a change in resistance of said gauge zone.

10. A strain gauge device comprising a unitary body of semiconductor material in the form of an elongate beam having a neutral axis, said body being of generally rectangular transverse cross-sectional configuration and of substantial thickness, said body having therein a first zone of a predetermined conductivity type between first and second piezoresistance gauge zones of the opposite conductivity type to thereby form a PN junction between said first zone and said first piezoresistance gauge zone and between said first zone and said second piezoresistance gauge zone, said junctions providing high impedance barriers which electrically isolate said first zone from said first and second piezoresistance gauge zones, said gauge zones being substantially thinner than said first zone, said gauge zones each having at least one dimension along a surface thereof which is great in comparison to its thickness, the neutral axis of said body being within said first zone, and means for connecting said surface of said unitary body to external circuitry, said means consisting of separated ohmic contacts disposed solely on said gauge zones, there being at least two said contacts on each of said gauge zones, whereby a change in stress of said gauge zones may be measured as a change in the resistance of said gauge zones.

11. A strain gauge device comprising a unitary body of semiconductor material having therein a first zone of a predetermined type conductivity between first and second piezoresistance gauge zones of a different type conductivity from said first zone to thereby form first and second junction barriers electrically isolating said first zone from said first and second piezoresistance gauge zones, said gauge zones each having at least one dimension along a surface thereof which is great in comparison to its thickness, means for connecting said surface of said unitary body to external circuitry, said means consisting of separated ohmic contacts disposed solely on said gauge zones, there being at least two said contacts on each of said gauge zones, and a closed chamber, said semiconductor body being mounted within said chamber, said chamber defining at least one opening therein to admit fluid under pressure whereby said fluid may exert a force on said body which generates a signal between said contacts representative of a change in resistance of said gauge zones.

12. A strain gauge device comprising a unitary body of semiconductor material having an N type conductivity zone and a piezoresistance gauge zone of P type conductivity to thereby form a PN junction barrier electrically isolating said zones, said gauge zone having at least one dimension along a surface thereof which is great in comparison to its thickness, and means for connecting said unitary body to external circuitry, said means consisting of separated ohmic contacts disposed solely on said gauge zone, there being at least two said contacts, whereby a change in stress of said gauge zone may be measured as a change in resistance of said gauge zone.

13. A semiconductor device comprising a unitary substantially toroidal body of semiconductor material having a first zone of one type conductivity between first and second piezoresistance gauge zones of a different type conductivity from said first zone to thereby form first and second junction barriers electrically isolating said first zone from said first and second piezoresistance gauge zones, said gauge zones each having at least one dimension along a surface thereof which is great in comparison to its thickness, and means for connecting said unitary body to external circuitry, said means consisting of separated ohmic contacts disposed solely on said gauge zones, there being at least two said contacts on each of said gauge zones, whereby a change in stress of said gauge zones may be measured as a change in the resistance of said gauge zones.

14. A strain gauge comprising a unitary body of semiconductor material, said body having a first zone of a predetermined conductivity type and first and second piezoresistance gauge zones, said zones being of the opposite conductivity type from said first zone to thereby form first and second PN junction barriers electrically isolating said first zone from said first and second piezoresistance gauge zones, said gauge zones having a thickness not in excess of 5 microns each, which thickness is substantially less than one dimension of a surface thereof and means for connecting said surface of said unitary body to external circuitry, said means consisting of separated ohmic contacts disposed solely on said gauge zones, there being at least two said contacts on each of said gauge zones, whereby a change in stress of said gauge zones may be measured as a change in the resistance of said gauge zones.

References Cited in the file of this patent

UNITED STATES PATENTS

| | | |
|---|---|---|
| 2,400,467 | Ruge | May 14, 1946 |
| 2,669,635 | Pfann | Feb. 16, 1954 |
| 2,866,014 | Burns | Dec. 23, 1958 |